(12) United States Patent
Niu (10) Patent No.: US 11,940,915 B2
(45) Date of Patent: Mar. 26, 2024

(54) CACHE ALLOCATION METHOD AND DEVICE, STORAGE MEDIUM, AND ELECTRONIC DEVICE

(71) Applicant: ZTE CORPORATION, Guangdong (CN)

(72) Inventor: Xinwei Niu, Guangdong (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 135 days.

(21) Appl. No.: 17/606,449

(22) PCT Filed: Apr. 30, 2020

(86) PCT No.: PCT/CN2020/088364
§ 371 (c)(1),
(2) Date: Oct. 25, 2021

(87) PCT Pub. No.: WO2020/259082
PCT Pub. Date: Dec. 30, 2020

(65) Prior Publication Data
US 2022/0206944 A1 Jun. 30, 2022

(30) Foreign Application Priority Data
Jun. 28, 2019 (CN) .......................... 201910580430.8

(51) Int. Cl.
*G06F 12/0806* (2016.01)
(52) U.S. Cl.
CPC ...... *G06F 12/0806* (2013.01); *G06F 2212/62* (2013.01)
(58) Field of Classification Search
CPC ............. G06F 12/0806; G06F 2212/62; G06F 12/0811; G06F 12/084; G06F 12/0846
(Continued)

(56) References Cited

U.S. PATENT DOCUMENTS

2014/0189239 A1 7/2014 Hum et al.
2014/0258630 A1 9/2014 Busaba et al.
(Continued)

FOREIGN PATENT DOCUMENTS

CN 102270180 A 12/2011
CN 104346294 A 2/2015
(Continued)

OTHER PUBLICATIONS

ZTE Corporation, Extended European Search Report, EP 20832000.2, dated May 11, 2022, 7pgs.
(Continued)

*Primary Examiner* — Hashem Farrokh
(74) *Attorney, Agent, or Firm* — CANTOR COLBURN LLP (57) ABSTRACT

A cache allocation method is provided. A core accesses a L3 cache when detecting a miss response from each of a L1 and a L2 cache accessed by the core through sending instruction fetching instructions configured to request L1 and L2 caches to return an instruction and data. The L1 cache is a private cache of the core, the L2 cache is a common cache corresponding to a core set including the core, the L3 cache is a common cache shared by core sets, and the miss response from the L2 cache carries network slice information. A planning unit in the L3 cache allocates the core sets to network slices, configures caches for the network slices according to the network slice information, and sends a hit response to the core. The hit response is configured to return data in a cache of a network slice corresponding to the core set.

18 Claims, 5 Drawing Sheets

(58) Field of Classification Search
USPC .......................................................... 711/118
See application file for complete search history.

(56) References Cited

U.S. PATENT DOCUMENTS

| | | | |
|---|---|---|---|
| 2016/0147654 A1* | 5/2016 | Zhao | G06F 12/0864 |
| | | | 711/130 |
| 2018/0060242 A1 | 3/2018 | Raghunath et al. | |
| 2018/0150300 A1 | 5/2018 | Eisen et al. | |
| 2018/0189232 A1 | 7/2018 | Pal et al. | |
| 2018/0349292 A1* | 12/2018 | Tal | G06F 12/0808 |
| 2019/0243780 A1* | 8/2019 | Gopal | G06F 12/0811 |
| 2020/0210070 A1* | 7/2020 | Durham | G06F 21/73 |
| 2021/0191777 A1* | 6/2021 | Roozbeh | G06F 12/0864 |

FOREIGN PATENT DOCUMENTS

| | | |
|---|---|---|
| CN | 106560798 A | 4/2017 |
| CN | 102830953 B | 8/2017 |
| CN | 108292220 A | 7/2018 |
| WO | 2017172294 A1 | 10/2017 |

OTHER PUBLICATIONS

Sanechips Technology Co., Ltd., International Search Report, PCT/CN2020/088364, dated Apr. 30, 2020, 6 pgs.
Feng Long Song, "An Implicitly Dynamic Shared Cache Isolation in Many-Core Architecture", Chinese Journal of Computers, vol. 32, No. 10 Oct. 2009.

* cited by examiner

CACHE ALLOCATION METHOD AND DEVICE, STORAGE MEDIUM, AND ELECTRONIC DEVICE

CROSS REFERENCE TO RELATED APPLICATIONS

The present disclosure is a United States National Stage Application filed under 35 U.S.C. § 371 of PCT Patent Application Serial No. PCT/CN2020/088364, filed Apr. 30, 2020, which claims the priority of Chinese patent application No. 201910580430.8 filed with the National Intellectual Property Administration, PRC on Jun. 28, 2019, which is incorporated by reference in its entirety.

TECHNICAL FIELD

The present disclosure relates to the field of multi-core network processor technologies, for example, to a cache allocation method and apparatus, a storage medium, and an electronic device.

BACKGROUND

In order for a plurality of network processing systems to meet requirements of frequent data exchange and data sharing in media processing, data mining and financial analysis, a sharing structure of instructions and data of a multi-core network processor and extensibility of the sharing structure should be optimized.

As processors change from traditional single-core era to multi-core era, the increase in the number of processors poses a huge challenge to a design of an on-chip storage architecture of a system-on-chip. On the one hand, the increase in the number of cores makes a chip scale increase rapidly, so that average memory access delay and maximum access delay of each core increase. On the other hand, different from a single-core system, a multi-core system pays more attention to researches on network slice parallelism for network applications in order to make full use of processing resources of a multi-core architecture. Therefore, in the related technologies, there is no good solution for solving increasing of the memory access delay and the maximum access delay due to the increase in the number of cores, and a low degree of the network slice parallelism.

SUMMARY

Embodiments of the present disclosure provide a cache allocation method and apparatus, a storage medium, and an electronic device to at least solve problems of increasing of memory access delay and maximum access delay due to the increase in the number of cores, and a low degree of network slice parallelism in the related technologies.

According to an embodiment of the present disclosure, a cache allocation method is provided, including: accessing, by a core, a level 3 cache in response to detecting a miss response from each of a level 1 cache and a level 2 cache, where the level 1 cache and the level 2 cache are accessed by the core through sending instruction fetching instructions; where the instruction fetching instructions are configured to request the level 1 cache and the level 2 cache that are accessed to return an instruction and data, the level 1 cache is a private cache of the core, the level 2 cache is a common cache corresponding to a core set including the core, the level 3 cache is a common cache shared by a plurality of core sets, and the miss response from the level 2 cache carries network slice information; allocating, by a planning unit disposed in the level 3 cache, the plurality of core sets to a plurality of network slices and configuring, by the planning unit, corresponding caches for the plurality of network slices according to the network slice information; and sending, by the planning unit, a hit response to the core, where the hit response is configured to return data in a cache of a network slice corresponding to the core set including the core.

According to another embodiment of the present disclosure, a cache allocation apparatus is provided, including: an access module in a core, configured to access a level 3 cache in response to detecting a miss response from each of a level 1 cache and a level 2 cache, where the level 1 cache and the level 2 cache are accessed by the core through sending instruction fetching instructions; where the instruction fetching instructions are configured to request the level 1 cache and the level 2 cache that are accessed to return an instruction and data, the level 1 cache is a private cache of the core, the level 2 cache is a common cache corresponding to a core set including the core, the level 3 cache is a common cache shared by a plurality of core sets, and the miss response from the level 2 cache carries network slice information; an allocation module in a planning unit disposed in the level 3 cache, configured to allocate the plurality of core sets to a plurality of network slices and configure corresponding caches for the plurality of network slices according to the network slice information; and a response module in the planning unit, configured to send a hit response to the core, where the hit response is configured to return data in a cache of a network slice corresponding to the core set including the core.

According to still another embodiment of the present disclosure, a storage medium is further provided, the storage medium stores a computer program, where the computer program is configured to perform steps in any of the method embodiments described above when executed.

According to yet another embodiment of the present disclosure, an electronic device is further provided, including: a memory and a processor, wherein the memory stores a computer program which, when executed by the processor, causes the processor to perform steps in any of the method embodiments described above.

BRIEF DESCRIPTION OF THE DRAWINGS

The drawings described herein are intended to understand the present disclosure and form a part of the present disclosure. The illustrative embodiments of the present disclosure and the description of the embodiments are intended to explain the present disclosure and are not to limit the present disclosure.

DETAILED DESCRIPTION

The present disclosure will be described below with reference to the accompanying drawings and in connection with embodiments.

The terms "first", "second" and the like in the specification and claims of the present disclosure and the accompanying drawings are used to distinguish similar objects without having to be used to describe the specified sequential or chronological order.

Embodiment 1

Figure 1:
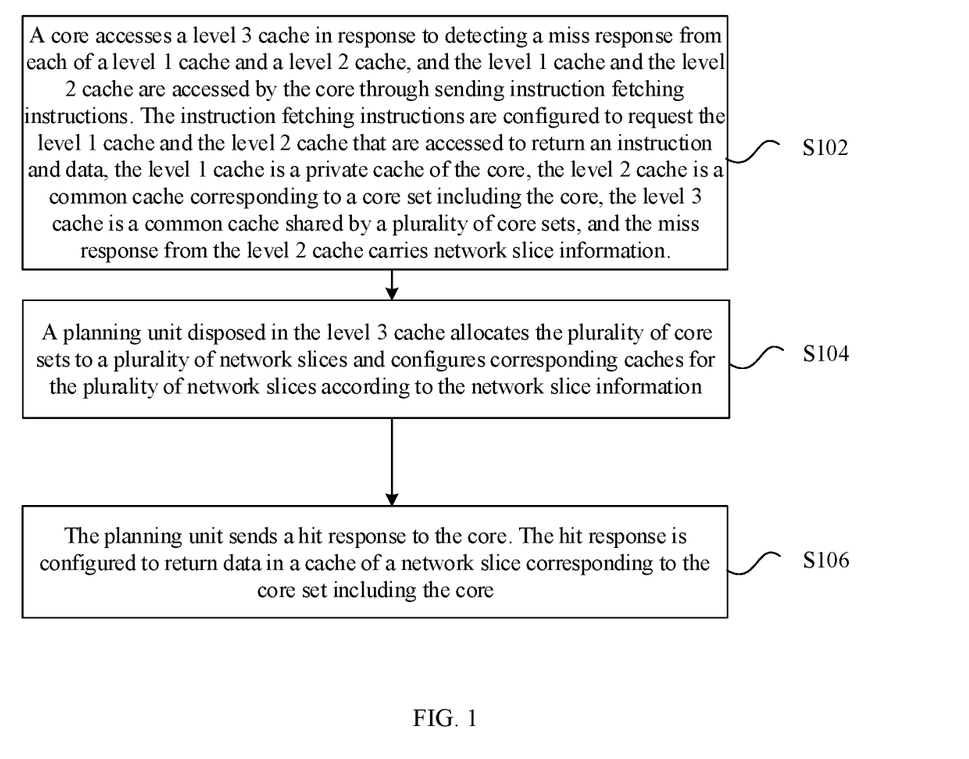
FIG. 1 is a flowchart of a cache allocation method according to an embodiment of the present disclosure.

In this embodiment, a cache allocation method is provided. FIG. 1 is a flowchart of a cache allocation method according to an embodiment of the present disclosure. As shown in FIG. 1, the flow includes the following steps.

In step S102, a core accesses a level 3 cache in response to detecting a miss response from each of a level 1 cache and a level 2 cache, and the level 1 cache and the level 2 cache are accessed by the core through sending instruction fetching instructions. The instruction fetching instructions are configured to request the level 1 cache and the level 2 cache that are accessed to return an instruction and data, the level 1 cache is a private cache of the core, the level 2 cache is a common cache corresponding to a core set including the core, the level 3 cache is a common cache shared by a plurality of core sets, and the miss response from the level 2 cache carries network slice information.

In step S104, a planning unit disposed in the level 3 cache allocates the plurality of core sets to a plurality of network slices and configures corresponding caches for the plurality of network slices according to the network slice information.

In step S106, the planning unit sends a hit response to the core. The hit response is configured to return data in a cache of a network slice corresponding to the core set including the core.

In the cache allocation method provided in the present disclosure, the planning unit disposed in the level 3 cache allocates the plurality of core sets to the plurality of network slices and configures corresponding caches for the plurality of network slices according to the network slice information. Therefore, problems of increasing of memory access delay and maximum access delay due to the increase in the number of cores, and a low degree of network slice parallelism in the related technologies are solved, thereby optimizing an on-chip storage architecture of a large-scale multi-core network processor and memory access delay of the core, and improving utilization of on-chip storage resources.

Figure 2:
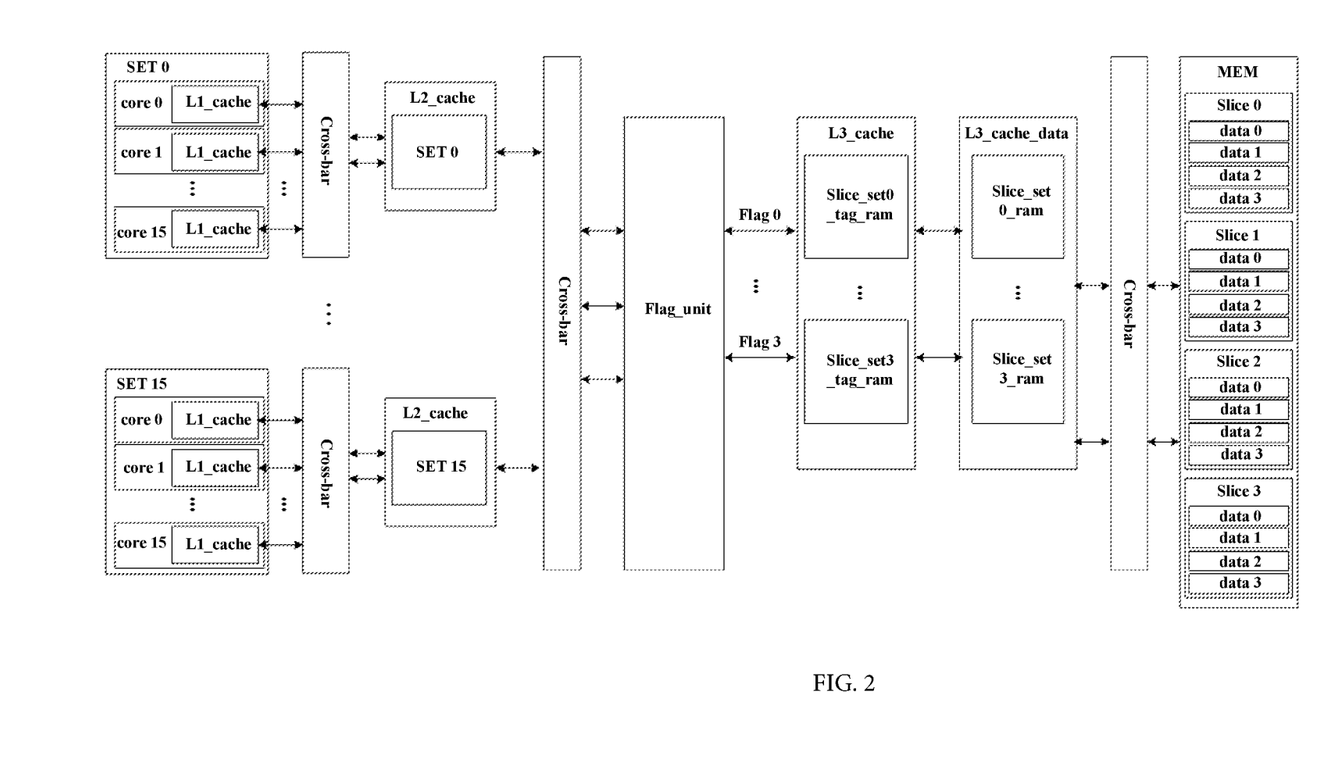
FIG. 2 is a schematic diagram of a multi-level cache model according to an embodiment of the present disclosure.

FIG. 2 is a schematic diagram of a multi-level cache model according to an embodiment of the present disclosure. As shown in FIG. 2, each core in FIG. 2 corresponds to a level 1 cache (L1_cache), and a core set (set) corresponds to a L2 cache (L2_cache). Consequently, a L3 cache (L3_cache) corresponds to the entire processor. An external memory (MEM) may also support this model.

In this embodiment, the core accesses the level 1 cache (L1_cache) first after sending an instruction fetching instruction. The L1_cache returns the instruction and data in the L1_cache if there is a hit in the L1_cache, and then waits for the next instruction fetching. The instruction fetch (PC), thread information (thread_info) and core information (core_info) are written to a queue L1_cache_miss_q if there is a miss in the L1_cache. Furthermore, the level 2 cache (L2_cache) is accessed in polling.

When accessing the level 2 cache (L2_cache), similarly, the L2_cache returns the instruction and the data in the L2 cache if there is a hit in the L2 cache, and then waits for the next instruction fetching. The instruction fetch (PC), thread information (thread_info), collection information (set_info) and network slice information (slice_info) are written to a queue L2_cache_miss_q if there is a miss in the L2_cache.

In an embodiment, the planning unit allocates the plurality of core sets to a plurality of network slices and configures corresponding caches for the plurality of network slices according to the network slice information including the following steps. That is, the planning unit divides the plurality of network slices into a plurality of network slice sets according to a preset division rule, and each of the plurality of network slice sets includes at least one network slice. The planning unit sets flag information in each of the plurality of network slice sets. And the planning unit divides a cache resource block for each network slice of a plurality of network slices in each of the plurality of network slice sets according to the flag information.

In an embodiment, the planning unit divides a cache resource block for each network slice of a plurality of network slices in each of the plurality of network slice sets according to the flag information including the following steps. That is, the planning unit divides the cache resource block for each network slice according to first flag information and second flag information. The first flag information is configured to indicate a number of network slices in each of the plurality of network slice sets, and the second flag information is configured to flag address information corresponding to the network slices.

In an embodiment, the method further includes a following step. That is, the planning unit adjusts the address information and data information of each network slice according to priorities of the network slices in each of the plurality of network slice sets.

Figure 3:
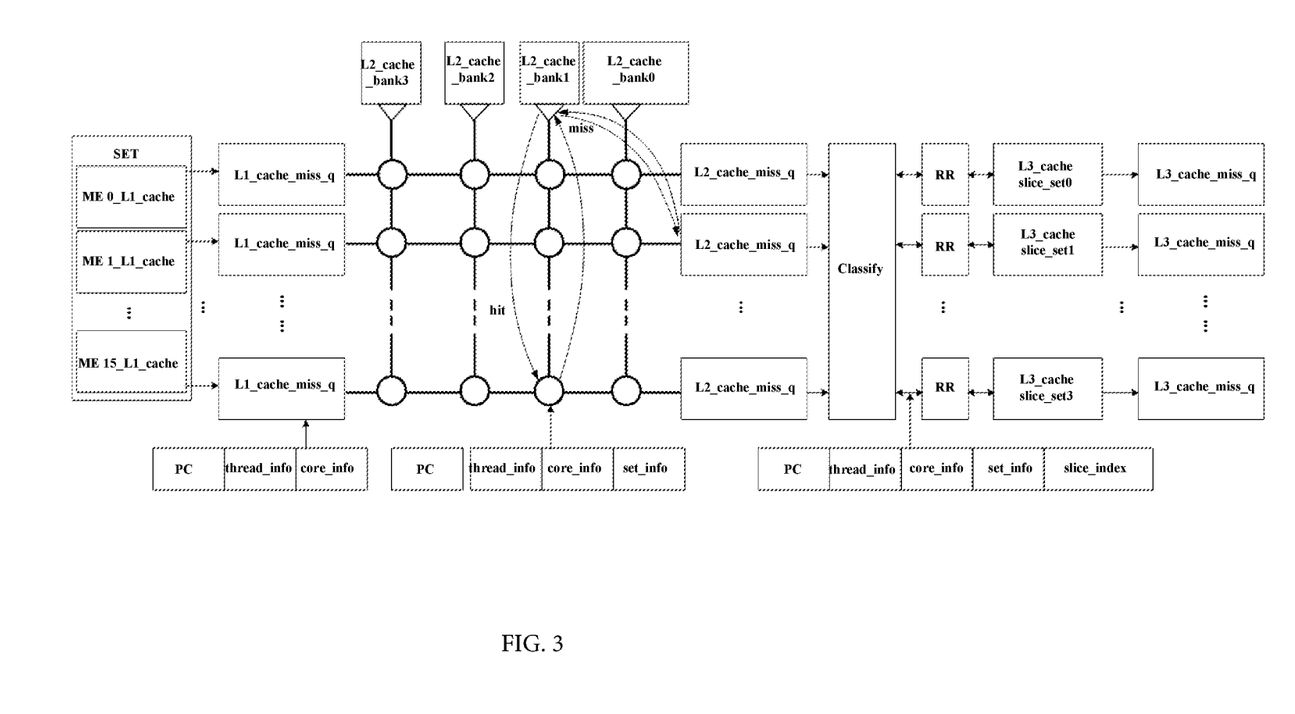
FIG. 3 is a schematic diagram of an access process of a level 3 cache according to an embodiment of the present disclosure.

In an embodiment, FIG. 3 is a schematic diagram of an access process of a level 3 cache according to the embodiment of the present disclosure. As shown in FIG. 3, instruction fetching requests of 32 sets are aggregated and classified according to the network slice information during accessing the L3_cache. A flag register (flag_unit) and a flag random access storage (tag_ram) are accessed first, and then specific addresses in the L3_cache are accessed. The instruction and data are returned if there is a hit in the L3_cache, and the instruction fetching instruction is send to an outermost MEM if there is a miss in the L3_cache.

Figure 4:
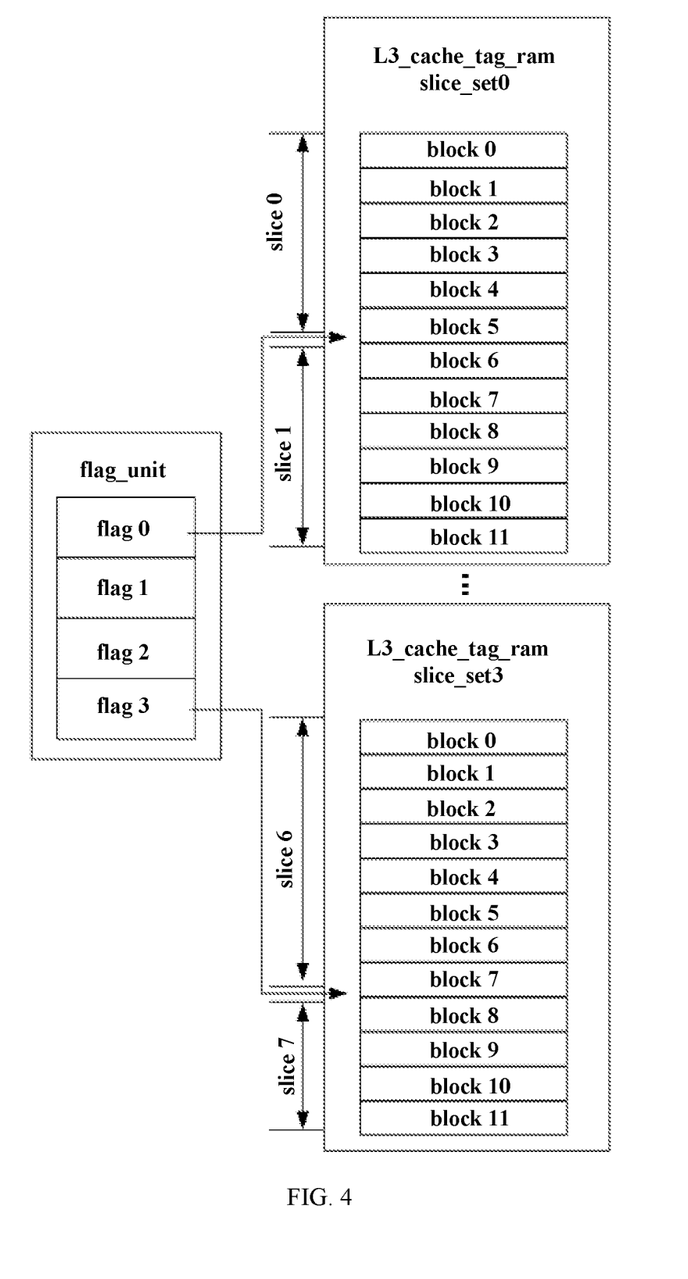
FIG. 4 is a schematic block diagram of a level 3 cache according to an embodiment of the present disclosure.
Figure 5:
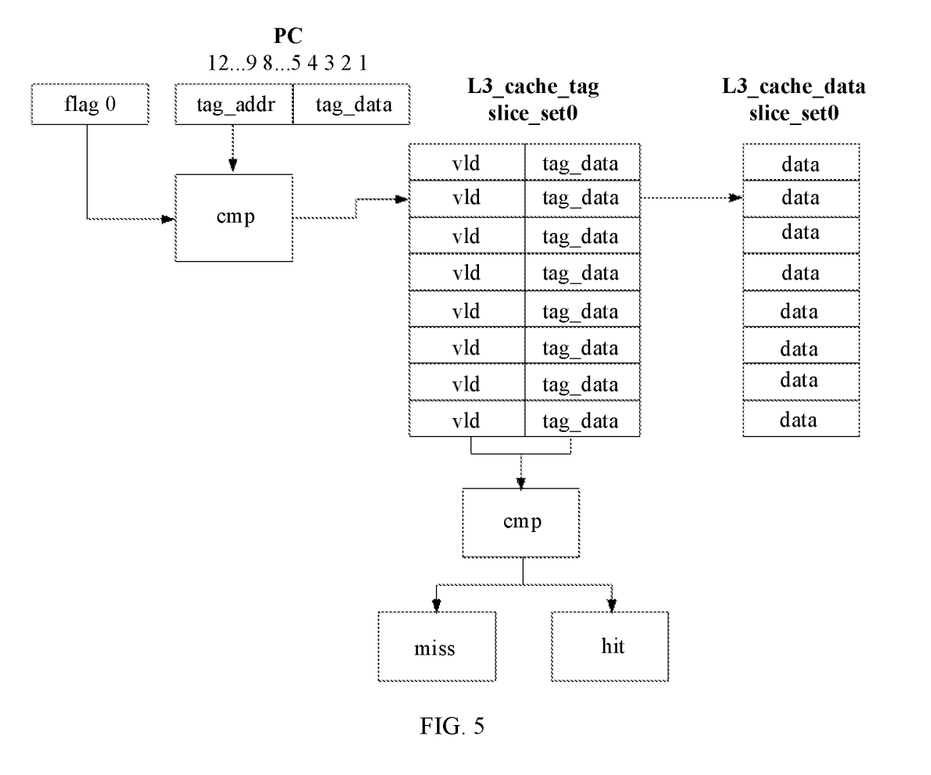
FIG. 5 is a schematic diagram of a data structure of a level 3 cache according to an embodiment of the present disclosure.

FIG. 4 is a schematic block diagram of a level 3 cache according to an embodiment of the present disclosure. As shown in FIG. 4, the level 3 cache has a planning unit flag_unit configured to provide different network slice sets with size-configurable caches, so as to improve storage management performance for different network slices. The network slices are managed by sets, and cache resources of the network slices are configured by the planning unit flag_unit to support configuration of multiple network slices. By default, the flag is marked in the middle of a cache of a network slice set, and there is no difference between sizes of caches of a plurality of network slice sets. Each set of network slices dominates one bank having X blocks in the L3_cache. If there is only one slice in a network slice set, the flag of the set is invalid and resources of the X blocks of the bank are exclusive to the one slice. If there are two slices in a network slice set, the X blocks are divided according to the flag. For example, 4 blocks are allocated to slice0 and X−4 blocks are allocated to slice1, where X is an even number and the number of blocks adjusted each time is also an even number. FIG. 5 is a schematic diagram of a data structure of a level 3 cache according to an embodiment of the present disclosure. As shown in FIG. 5, flag_unit mainly stores division addresses of vld and tag_ram, and the vld indicates whether the number of network slices in one network slice set is 2. Depths of tag and data in the L3_cache are the same and in one-to-one correspondence, and a tag address and a data width of each slice are adjusted when priorities of the slices in the network slice set are different.

In an embodiment, the core sends an instruction fetching instruction to an external memory in response to detecting a miss response from the level 3 cache, and the level 3 cache is accessed by the core through sending the instruction fetching instruction. The core receives an instruction fetching result fed back by the external memory. And the planning unit updates the address information and the data information according to the instruction fetching result.

In this embodiment, the external memory sends the instruction fetching instruction to the planning unit after receiving the instruction fetching instruction.

In this embodiment, data of different network slices are stored in the outermost MEM, and the L3_cache is updated according to the flag information at the same time when the fetched instruction and data are returned. The external memory MEM may be expanded to a large scale and has a low cost, which is able to arrange instructions and data of different network slices in sequence and update data commonly used by different network slices into the level 3 cache.

In this embodiment, a length of the instruction fetch PC is determined according to a maximum space of the instruction and data in each network slice. The network slice information is carried when accessing the MEM.

At the same time, the outermost MEM may easily expand a plurality of network slices, which needs to arrange data of a plurality of network slices in sequence and expand flag_unit and the L3_cache in the same proportion. In addition, the number of units flag_unit may be increased, and a contrast logic may be modified to make the network slice granularity management more detailed. For example, two slice sets and four slices are used as granularity for management, so that one slice in a slice set 0 occupies resources of the cache of a slice set 1. According to the core planning for a multi-core network system, cores of different sets of the same network slice execute the same slice service, and a certain amount of shared L2_cache and L3_cache are allocated to improve a reuse rate of resources.

In an embodiment, the number of instruction fetching instructions sent by the core is N when accessing the caches, where N is a positive integer not less than 1.

In this embodiment, in order to mask the instruction fetching delay of the cores, each core fetches a plurality of instructions one time, thereby masking the competing delay between the cores.

The following scenarios are also provided for understanding in this embodiment.

Each core has a private cache of 1 k as the level 1 cache. Every 16 cores as a set has a shared cache of 32 k. The level 2 cache is completely shared for the 16 cores. 16 sets have a cache of 128 k as the level 3 cache, which is associated with an off-chip memory MEM. When performing the instruction fetching, a core 0 accesses the level 1 cache first. The instruction and data are returned to the core 0 if there is a hit in the level 1 cache. The level 2 cache is accessed if there is a miss in the level 1 cache. The instruction and data are returned to the core 0 and the level 1 cache is updated if there is a hit in the level 2 cache. Similarly, the level 3 cache is accessed if there is miss in the level 2 cache. The instruction fetch PC of the network slice is 10 bits, and higher 6 bits are selected as tag_addr and lower 4 bits are selected as tag_data when priorities of the slices in the slice set are the same. For all the slice sets, a maximum total tag_addr for slices 0 and 1 is 12 bits. If the resource of the slice 0 is adjust to 8 blocks and the resource of the slice 1 is adjusted to 4 blocks according to a slice weight, an address of the slice 0 is adjusted to PC [7:0] and tag_data of the slice 0 is adjusted to PC [12:8]. Accordingly, an address of the slice 1 is adjusted to PC [3:0] and tag_data of the slice 1 is adjusted to PC [12:4]. During the accessing, an instruction fetching address is compared with the flag, then the data in tag_ram is obtained. Whether there is a hit or a miss is determined according to vld and tag_data. The instruction in the L3_cache_data are fetched if there is a hit in the L3_cache_data, and the instruction fetching is turned to an outer MEM if there is a miss in the L3_cache_data. In a case where the instruction is fetched from the MEM, the instruction is returned to the core and is compared with the flag_unit, and then tag_ram and data_ram are updated.

With the description of the above embodiments, a person skilled in the art may appreciate that the method according to the above embodiments may be implemented by means of software plus a general hardware platform, and of course may also be implemented by means of hardware. Based on such an understanding, the technical solutions of the present disclosure may be embodied in the form of a software product stored in a storage medium (such as a read-only memory (ROM) or a random access memory (RAM), a magnetic disk or an optical disk) including a plurality of instructions configured to cause a terminal device (which may be a mobile phone, a computer, a server, a network device, or the like) to perform the methods described in the embodiments of the present disclosure.

Embodiment 2

In this embodiment, a cache allocation apparatus is further provided. The apparatus is configured to implement the above embodiments and implementations which are not repeated herein. As used above, the implementation of the term "module" may achieve a combination of software and/or hardware with respect to a predetermined function. Although the apparatus described in the following embodiments may be implemented in software, an implementation of hardware, or a combination of software and hardware, is also possible and contemplated.

Figure 6:
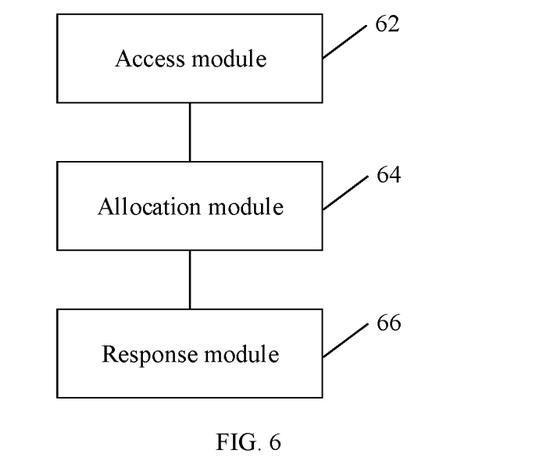
FIG. 6 is a block diagram of a cache allocation apparatus according to an embodiment of the present disclosure.

FIG. 6 is a block diagram of a cache allocation apparatus according to an embodiment of the present disclosure. As shown in FIG. 6, the apparatus includes an access module 62 in a core, which is configured to access a level 3 cache in response to detecting a miss response from each of a level 1 cache and a level 2 cache, where the level 1 cache and the level 2 cache are accessed by the core through sending instruction fetching instructions; where the instruction fetching instructions are configured to request the level 1 cache and the level 2 cache that are accessed to return an instruction and data, the level 1 cache is a private cache of the core, the level 2 cache is a common cache corresponding to a core set including the core, the level 3 cache is a common cache shared by a plurality of core sets, and the miss response from the level 2 cache carries network slice information; an allocation module 64 in a planning unit disposed in the level 3 cache, which is configured to allocate the plurality of core sets to a plurality of network slices and configure corresponding caches for the plurality of network slices according to the network slice information; and a response module 66 in the planning unit, which is configured to send a hit response to the core, where the hit response is configured to return data in a cache of a network slice corresponding to the core set including the core.

In an embodiment, the allocation module includes a first dividing unit configured to divide the plurality of network slices into a plurality of network slice sets according to a preset division rule, where each of the plurality of network slice sets comprises at least one network slice; a setting unit configured to set flag information in each of the plurality of network slice sets; and a second dividing unit configured to divide a cache resource block for each network slice of a plurality of network slices in each of the plurality of network slice sets according to the flag information.

The plurality of modules may be implemented by software or hardware, and the hardware may be implemented in the following manner, but is not limited thereto. The modules are located in the same processor. Alternatively, the plurality of modules are respectively located in different processors in any combination. In addition, the above multiple modules are located in the same network processing system.

Embodiment 3

An embodiment of the present disclosure further provides a storage medium storing a computer program. The computer program is configured to perform the steps in any of the method embodiments described above when executed.

Alternatively, in this embodiment, the storage medium may be configured to store a computer program for performing the following steps.

In step S1, a core accesses a level 3 cache in response to detecting a miss response from each of a level 1 cache and a level 2 cache, and the level 1 cache and the level 2 cache are accessed by the core through sending instruction fetching instructions. The instruction fetching instructions are configured to request the level 1 cache and the level 2 cache that are accessed to return an instruction and data, the level 1 cache is a private cache of the core, the level 2 cache is a common cache corresponding to a core set including the core, the level 3 cache is a common cache shared by a plurality of core sets, and the miss response from the level 2 cache carries network slice information.

In step S2, a planning unit disposed in the level 3 cache allocates the plurality of core sets to a plurality of network slices and configures corresponding caches for the plurality of network slices according to the network slice information.

In step S3, the planning unit sends a hit response to the core. The hit response is configured to return data in a cache of a network slice corresponding to the core set including the core.

Alternatively, in this embodiment, the storage medium may include, but is not limited to, a USB flash drive, a ROM, a RAM, a removable hard disk, a magnetic disk, an optical disc, or other media capable of storing the computer program.

An embodiment of the present disclosure further provides an electronic device including a memory and a processor. The memory stores a computer program which, when executed by the processor, causes the processor to perform the steps in any of the method embodiments described above.

Alternatively, the electronic device may further include a transmission device coupled to the processor and an input and output device coupled to the processor.

Alternatively, in this embodiment, the processor may be configured to perform the following steps through the computer program.

In step S1, a core accesses a level 3 cache in response to detecting a miss response from each of a level 1 cache and a level 2 cache, and the level 1 cache and the level 2 cache are accessed by the core through sending instruction fetching instructions. The instruction fetching instructions are configured to request the level 1 cache and the level 2 cache that are accessed to return an instruction and data, the level 1 cache is a private cache of the core, the level 2 cache is a common cache corresponding to a core set including the core, the level 3 cache is a common cache shared by a plurality of core sets, and the miss response from the level 2 cache carries network slice information.

In step S2, a planning unit disposed in the level 3 cache allocates the plurality of core sets to a plurality of network slices and configures corresponding caches for the plurality of network slices according to the network slice information.

In step S3, the planning unit sends a hit response to the core. The hit response is configured to return data in a cache of a network slice corresponding to the core set including the core.

In an embodiment, for a specific example in this embodiment, refer to the examples described in the foregoing embodiments and embodiments, and this embodiment is not described herein again.

It should be understood by those skilled in the art that the plurality of modules or steps of the present disclosure described above may be implemented by general computing devices, which may be centralized on a single computing device, or distributed over a network composed of a plurality of computing devices. In an embodiment, these modules or steps may be implemented by program code executable by the computing device, which thus may be stored in a storage device and executed by the computing device. In some cases, the steps may be implemented in a sequence different from that shown or described herein, the modules or the steps may be respectively fabricated into a plurality of integrated circuit modules, or some of the plurality of modules or steps may be fabricated into a single integrated circuit module. The present disclosure is not limited to any specified combination of hardware and software.

What is claimed is:

1. A cache allocation method, comprising:
   accessing, by a core, a level 3 cache in response to detecting a miss response from each of a level 1 cache and a level 2 cache, wherein the level 1 cache and the level 2 cache are accessed by the core through sending instruction fetching instructions; wherein the instruction fetching instructions are configured to request the level 1 cache and the level 2 cache that are accessed to return an instruction and data, the level 1 cache is a private cache of the core, the level 2 cache is a common cache corresponding to a core set including the core, the level 3 cache is a common cache shared by a plurality of core sets, and the miss response from the level 2 cache carries network slice information;
   allocating, by a planning unit disposed in the level 3 cache, the plurality of core sets to a plurality of network slices and configuring, by the planning unit, corresponding caches for the plurality of network slices according to the network slice information; and sending, by the planning unit, a hit response to the core, wherein the hit response is configured to return data in a cache of a network slice corresponding to the core set including the core.

2. The method according to claim 1, wherein configuring, by the planning unit, the corresponding caches for the plurality of network slices comprises:
dividing, by the planning unit, the plurality of network slices into a plurality of network slice sets according to a preset division rule, wherein each of the plurality of network slice sets comprises at least one network slice;
setting, by the planning unit, flag information in each of the plurality of network slice sets; and
dividing, by the planning unit, a cache resource block for each network slice of a plurality of network slices in each of the plurality of network slice sets according to the flag information.

3. The method according to claim 2, wherein the flag information comprises first flag information and second flag information, and dividing, by the planning unit, a cache resource block for each network slice of the plurality of network slices in each of the plurality of network slice sets according to the flag information comprises:
dividing, by the planning unit, the cache resource block for each network slice according to the first flag information and the second flag information, wherein the first flag information is configured to indicate a number of network slices in each of the plurality of network slice sets, and the second flag information is configured to flag address information corresponding to the network slices.

4. The method according to claim 3, further comprising:
adjusting, by the planning unit, the address information and data information of each network slice according to priorities of the network slices in each of the plurality of network slice sets.

5. The method according to claim 4, further comprising:
sending, by the core, an instruction fetching instruction to an external memory in response to detecting a miss response from the level 3 cache, wherein the level 3 cache is accessed by the core through sending the instruction fetching instruction, and receiving, by the core, an instruction fetching result fed back by the external memory; and
updating, by the planning unit, the address information and the data information according to the instruction fetching result.

6. The method according to claim 1, wherein a number of instruction fetching instructions sent by the core is N when accessing caches, wherein N is a positive integer not less than 1.

7. A non-transitory storage medium storing a computer program, wherein the computer program is configured to perform a cache allocation method when executed; wherein the method comprises:
accessing a level 3 cache in response to detecting a miss response from each of a level 1 cache and a level 2 cache, wherein the level 1 cache and the level 2 cache are accessed by the core through sending instruction fetching instructions; wherein the instruction fetching instructions are configured to request the level 1 cache and the level 2 cache that are accessed to return an instruction and data, the level 1 cache is a private cache of the core, the level 2 cache is a common cache corresponding to a core set including the core, the level 3 cache is a common cache shared by a plurality of core sets, and the miss response from the level 2 cache carries network slice information;
allocating the plurality of core sets to a plurality of network slices and configuring corresponding caches for the plurality of network slices according to the network slice information; and
sending a hit response to the core, wherein the hit response is configured to return data in a cache of a network slice corresponding to the core set including the core.

8. The non-transitory storage medium according to claim 7, wherein configuring the corresponding caches for the plurality of network slices comprises:
dividing the plurality of network slices into a plurality of network slice sets according to a preset division rule, wherein each of the plurality of network slice sets comprises at least one network slice;
setting flag information in each of the plurality of network slice sets; and
dividing a cache resource block for each network slice of a plurality of network slices in each of the plurality of network slice sets according to the flag information.

9. The non-transitory storage medium according to claim 8, wherein the flag information comprises first flag information and second flag information, and dividing a cache resource block for each network slice of the plurality of network slices in each of the plurality of network slice sets according to the flag information comprises:
dividing the cache resource block for each network slice according to the first flag information and the second flag information, wherein the first flag information is configured to indicate a number of network slices in each of the plurality of network slice sets, and the second flag information is configured to flag address information corresponding to the network slices.

10. The non-transitory storage medium according to claim 9, wherein the method further comprises:
adjusting the address information and data information of each network slice according to priorities of the network slices in each of the plurality of network slice sets.

11. The non-transitory storage medium according to claim 10, wherein the method further comprises:
sending an instruction fetching instruction to an external memory in response to detecting a miss response from the level 3 cache, wherein the level 3 cache is accessed by the core through sending the instruction fetching instruction, and receiving an instruction fetching result fed back by the external memory; and
updating the address information and the data information according to the instruction fetching result.

12. The non-transitory storage medium according to claim 7, wherein a number of instruction fetching instructions sent by the core is N when accessing caches, wherein N is a positive integer not less than 1.

13. An electronic device comprising a memory and a processor, wherein the memory stores a computer program which, when executed by the processor, causes the processor to perform a cache allocation method; wherein the method comprises:
accessing a level 3 cache in response to detecting a miss response from each of a level 1 cache and a level 2 cache, wherein the level 1 cache and the level 2 cache are accessed by the core through sending instruction fetching instructions; wherein the instruction fetching instructions are configured to request the level 1 cache and the level 2 cache that are accessed to return an instruction and data, the level 1 cache is a private cache of the core, the level 2 cache is a common cache corresponding to a core set including the core, the level 3 cache is a common cache shared by a plurality of core sets, and the miss response from the level 2 cache carries network slice information;

allocating the plurality of core sets to a plurality of network slices and configuring corresponding caches for the plurality of network slices according to the network slice information; and sending a hit response to the core, wherein the hit response is configured to return data in a cache of a network slice corresponding to the core set including the core.

14. The electronic device according to claim 13, wherein configuring the corresponding caches for the plurality of network slices comprises:

dividing the plurality of network slices into a plurality of network slice sets according to a preset division rule, wherein each of the plurality of network slice sets comprises at least one network slice;

setting flag information in each of the plurality of network slice sets; and dividing a cache resource block for each network slice of a plurality of network slices in each of the plurality of network slice sets according to the flag information.

15. The electronic device according to claim 14, wherein the flag information comprises first flag information and second flag information, and dividing a cache resource block for each network slice of the plurality of network slices in each of the plurality of network slice sets according to the flag information comprises:

dividing the cache resource block for each network slice according to the first flag information and the second flag information, wherein the first flag information is configured to indicate a number of network slices in each of the plurality of network slice sets, and the second flag information is configured to flag address information corresponding to the network slices.

16. The electronic device according to claim 15, wherein the method further comprises:

adjusting the address information and data information of each network slice according to priorities of the network slices in each of the plurality of network slice sets.

17. The electronic device according to claim 16, wherein the method further comprises:

sending an instruction fetching instruction to an external memory in response to detecting a miss response from the level 3 cache, wherein the level 3 cache is accessed by the core through sending the instruction fetching instruction, and receiving an instruction fetching result fed back by the external memory; and updating the address information and the data information according to the instruction fetching result.

18. The electronic device according to claim 13, wherein a number of instruction fetching instructions sent by the core is N when accessing caches, wherein N is a positive integer not less than 1.

* * * * *